United States Patent
Inagaki et al.

(10) Patent No.: US 6,721,622 B2
(45) Date of Patent: Apr. 13, 2004

(54) METHOD OF COMPENSATING PROFILE DATA, AND NUMERICAL CONTROLLER AND MACHINE TOOL FOR PRACTICING THE METHOD

(75) Inventors: Tatsuya Inagaki, Aichi-ken (JP); Toshihiro Yonezu, Aichi-ken (JP); Satoshi Abeta, Aichi-ken (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 10/244,029

(22) Filed: Sep. 16, 2002

(65) Prior Publication Data

US 2003/0114954 A1 Jun. 19, 2003

(51) Int. Cl.[7] .......................... B24B 49/10; G05B 19/25
(52) U.S. Cl. ...................... 700/193; 700/170; 700/186; 318/571
(58) Field of Search ................................ 700/193, 190, 700/192, 170, 186; 318/571

(56) References Cited

U.S. PATENT DOCUMENTS 4,990,840 A * 2/1991 Migda ........................ 318/571

FOREIGN PATENT DOCUMENTS

| EP | 0 265 607 | 5/1988 | | |
|---|---|---|---|---|
| EP | 0 304 876 | 3/1989 | | |
| EP | 0 328 972 | 8/1989 | | |
| EP | 0 334 345 | 9/1989 | | |
| GB | 2 321 026 | 7/1998 | | |
| GB | 2321026 A | * 7/1998 | ........... | B24B/49/10 |
| JP | 6-22778 | 3/1994 | | |

OTHER PUBLICATIONS

Patent Abstract of Japan, JP 63–077638, Apr. 7, 1988.

* cited by examiner

*Primary Examiner*—Leo Picard
*Assistant Examiner*—Michael D. Masinick
(74) *Attorney, Agent, or Firm*—Oblon, Spivak, McClelland, Maier & Neustadt, P.C.

(57) ABSTRACT

A profile data compensating method comprises a step of generating effective profile data by operating a machine tool under a non-load condition in accordance with theoretical profile data, a step of generating first error profile data representing error components of a control system, a step of generating first compensated profile data based upon the first error profile data, a step of generating measured profile data by measuring the shape of the workpiece machined in accordance with the first compensated profile data, a step of generating second error profile data representing error components of a mechanical system, and a step of generating second compensated profile data based upon the first and second error profile data.

6 Claims, 5 Drawing Sheets

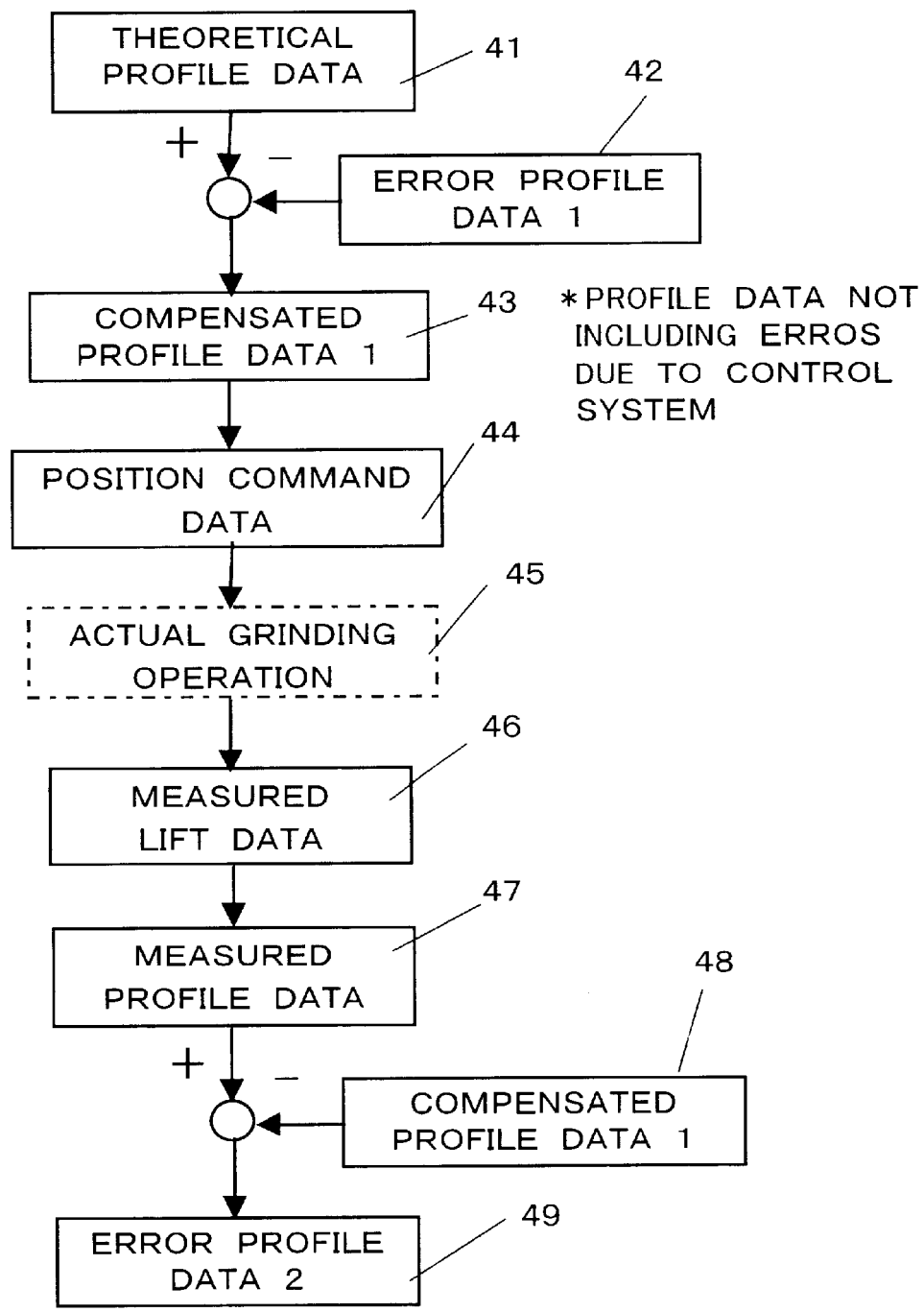

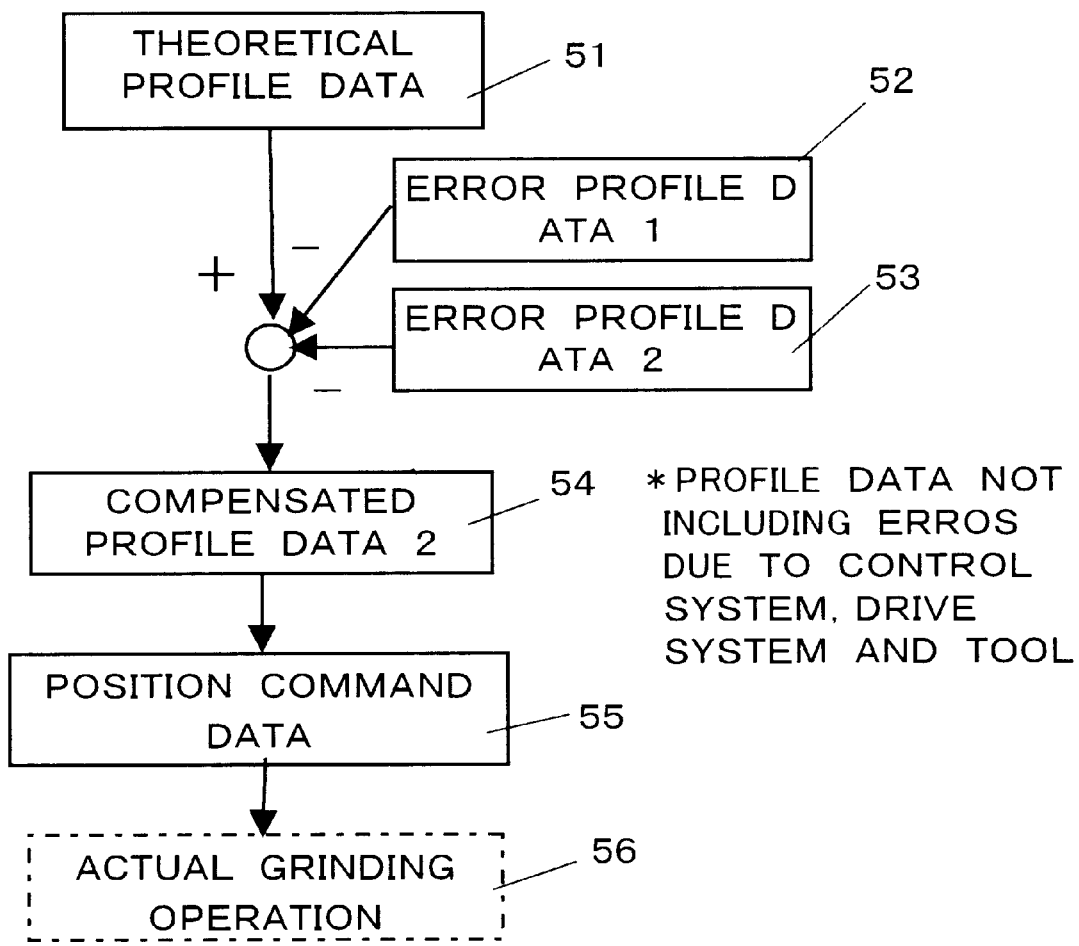

METHOD OF COMPENSATING PROFILE DATA, AND NUMERICAL CONTROLLER AND MACHINE TOOL FOR PRACTICING THE METHOD

CROSS REFERENCE TO RELATED APPLICATIONS

This application is based on and claims priority under 35 U.S.C. §119 with respect to a Japanese Patent Application No. 2001-280275, filed on Sep. 14, 2001, the entire content of which is incorporated herein by reference.

BACKGROUND OF THE INVENTION

1. Field of the Invention

The present invention relates to a method of compensating profile data capable of machining workpieces such as a cam and the like in high machining efficiency and accuracy. More particularly, the present invention pertains to a numerical controller for practicing the method and to a machine tool provided with a numerical controller for practicing the method.

2. Description of the Related Art

With improvements in performance and precision of various machines, higher machining accuracy has been demanded for components of such various machines. For instance, a camshaft and a crankshaft of an automobile engine are required to have a cam and a crankpin whose sliding surfaces are to be of a high dimensional accuracy and a high degree of a surface roughness.

However, when machining the aforementioned cam (a non-circular workpiece) and the crankpin, especially when grinding the cam and the crankpin, the cam and the crankpin cannot be machined by simply feeding a tool (e.g. a grinding wheel) through an amount to be machined relative to such rotating workpiece. Accordingly, it is necessary to machine the workpiece by controlling the rotational angle of the workpiece and the feed amount or position of the tool in synchronism relation with each other. Generally, the machining process of the workpiece is performed by numerically controlling a work spindle and a tool feed axis in accordance with predetermined profile data (hereinafter, merely referred to as profile data).

However, the above-described type of machining process applied to the workpiece is too complicated to easily machine the workpiece with a high machining accuracy along an ideal shape. For example, some dimensional errors may occur. In order to reduce the occurrence of the dimensional errors, various methods of compensating the profile data have been developed. Some of such methods for compensating the profile data are described hereinbelow taking cam grinding as an example.

In a typical method, an actual machining operation is performed based upon theoretical profile data which is geometrically obtained from ideal cam lift data (i.e. finished shape data). Measured lift data is obtained by actually measuring lift amounts at plural angular positions of the cam by means of a cam measuring device after performing the actual machining operation. Machining errors are then confirmed by comparing the measured lift data with the ideal lift data. Compensated profile data is finally obtained by directly reflecting the machining errors on the ideal lift data or on the theoretical profile data.

Another method of compensating the profile data is disclosed in a Japanese Patent Publication No. 6(1994)-22778. A grinding machine (i.e. a machine tool) is operated in accordance with theoretical profile data with a camshaft (i.e. a workpiece) being set on a work spindle, wherein the operation is performed under a non-load condition, namely without engaging a grinding wheel with the workpiece. During this operation, actual rotational angles of the work spindle and actual feed amounts or positions of a wheel head (i.e. a tool feed axis) are detected by respective encoders so as to obtain effective values thereof. Errors of the effective values are obtained by comparing the effective values with command values according to the theoretical profile data. Compensated profile data is obtained by reflecting the errors on the theoretical profile data.

However, where the machining accuracy is to be further higher, the machine errors cannot be thoroughly compensated for by the use of any one of the above-described methods of compensating the profile data. This problem may be considered for the reasons that there are plural error-causing factors or systems and that error components (error characteristics) caused by the corresponding error-causing factors or systems have been mixed in the entirety of machining errors. That is, even when particular error components can be compensated, other error components of the other systems may still remain, so that the machining errors are difficult to compensate completely. Further, when a particular error component is compensated excessively, a new error may occur.

For instance, let it be the case that error lift data is obtained from the difference between the measured lift data obtained by measuring the machined workpiece and the original ideal lift data and that the ideal lift data which represents the base of shape information of the workpiece is then modified by the error lift data so as to generate new ideal profile data through a lift-profile conversion processing. In this case, the ideal profile data may fluctuate in dependence upon a machining condition of the workpiece from which the measured lift data was obtained. The error components of the control system calculated from the fluctuated ideal profile data may also fluctuate. Therefore, according to the above-described method of compensating the ideal lift data by the use of the error lift data, accurate extraction of the error components caused by the control system may not be performed.

When an attempt is made to compensate the entirety of machine errors through the repetition of a try-and-error effort for adjusting correction levels (weights) for error components of a particular system, a man-power for the compensation may be extremely increased. Further, such compensation procedure is required to be performed every time a workpiece or a tool is replaced with another one, which would lead to a troublesome and inefficient operating process.

Accordingly, it is necessary to provide an improved method of compensating profile data which method is capable of efficiently obtaining compensation profile data for a higher accuracy machining. Further, it is necessary to provide a numerical controller and a machine tool which are capable of practicing the above-described profile data compensating method.

SUMMARY OF THE INVENTION

The present invention has been created to solve the aforementioned problems, and it is a primary object of the present invention to provide an improved method of compensating profile data which method is capable of efficiently obtaining compensated profile data for a higher accuracy machining by dividing the entirety of machine errors into error components of the control system due to characteristics of those ranging from a numerical controller up to a work spindle and a tool feed axis and error components of mechanical systems due to characteristics of those mechanical elements including driving mechanisms, tools, other mechanical elements of the machine tool, so that the error components can be made clear separately of the control system as well as of the mechanical system.

In one aspect of the present invention, a method of compensating profile data is provided to be practiced in a numerical controller for a machine tool which machines a workpiece by numerically controlling a work spindle and a tool feed axis in accordance with profile data composed of rotational angle commands of the work spindle for rotating the workpiece as an object to be machined and feed commands of the tool feed axis for displacing a tool for machining the workpiece in synchronism with the rotation angle of the work spindle. The method comprises an effective profile data generating step of generating effective profile data from effective data which is obtained by numerically controlling the work spindle and the tool feed axis in accordance with theoretical profile data obtained geometrically based upon finished shape data of the workpiece under the condition that the tool feed axis is off-set by a machining amount (i.e., allowance) or more relative to the workpiece so as not to actually machine the workpiece being set on the work spindle so that the machine tool is operated without having machining load applied thereto, and by actually detecting the rotation angles of the work spindle and the feed amounts or positions of the tool feed axis in the state of such non-machining load acting on the machine tool; a first error profile data generating step of generating first error profile data corresponding to the difference between the effective profile data and the theoretical profile data; a first compensated profile data generating step of generating first compensated profile data by compensating the theoretical profile data for the first error profile data; a measured profile data generating step of generating measured profile data through a lift-profile conversion processing based upon measured lift data which is obtained by numerically controlling the work spindle and the tool feed axis in accordance with the first compensated profile data to actually machine a workpiece and by measuring the workpiece actually machined; a second error profile data generating step of generating second error profile data corresponding to the difference between the measured profile data and the first compensated profile data; and a second compensated profile data generating step of generating second compensated profile data by compensating the first compensated profile data for the second error profile data or by compensating the theoretical profile data for the first error profile data and the second error profile data.

More specifically, the error components of the control system are extracted as the first error profile data and the error components of the mechanical system are extracted as the second error profile data. The first error profile data corresponds to the difference between the effective profile data and the theoretical profile data. The effective profile data is generated based upon the effective data which is detected when the machine tool is operated under the non-load condition in accordance with the theoretical profile data. Therefore, the first error profile data does not involve the error components of the mechanical system and is inherent to the control system. The workpiece machined in accordance with the first compensated profile data which is obtained by compensating the theoretical profile data for the first error profile data substantially does not involve the error components of the control system.

The second error profile data corresponds to the difference between the measured profile data and the first compensated profile data from which the error components of the control system has been substantially excluded. The measured profile data is generated based upon the measured lift data obtained by measuring the workpiece which was actually machined in accordance with the first compensated profile data. Therefore, the second error profile data does not involve the error components of the control system and is inherent to the mechanical system. The workpiece machined in accordance with the second compensated profile data which is obtained by compensating for the second error profile data does not involves not only the error components of the mechanical system but also the error components of the control system having been excluded on a previous stage.

Further, in the method according to the present invention, because error components which cause the machining errors are separated into those for the control system and those for the mechanical system and because the errors involved in one of the systems is compensated independently of those involved in the other system, the profile compensation can be performed efficiently. Specifically, the error components of the control system does no vary essentially. Therefore, where the driving system is deteriorated with age, where the workpiece is exchanged with another one, or where the tool is exchanged with another one, it is sufficient to consider varying the error components of the mechanical system only. In this case, the profile data compensating operation can be efficiently performed by regenerating the second error profile data and by updating the second compensated profile data.

BRIEF DESCRIPTION OF THE DRAWING FIGURES

Various other objects, features and attendant advantages of the present invention will readily be appreciated as the same becomes better understood by reference to the following detailed description of a preferred embodiment when considered in connection with the accompanying drawings, in which:

FIG. 4 is a flow chart explaining a process for generating second error profile data in the profile data compensating operation according to the embodiment of the present invention; and FIG. 5 is a flow chart explaining a process for generating second compensated profile data in the profile data compensating operation according to the embodiment of the present invention.

DESCRIPTION OF THE PREFERRED EMBODIMENT

Figure 1:
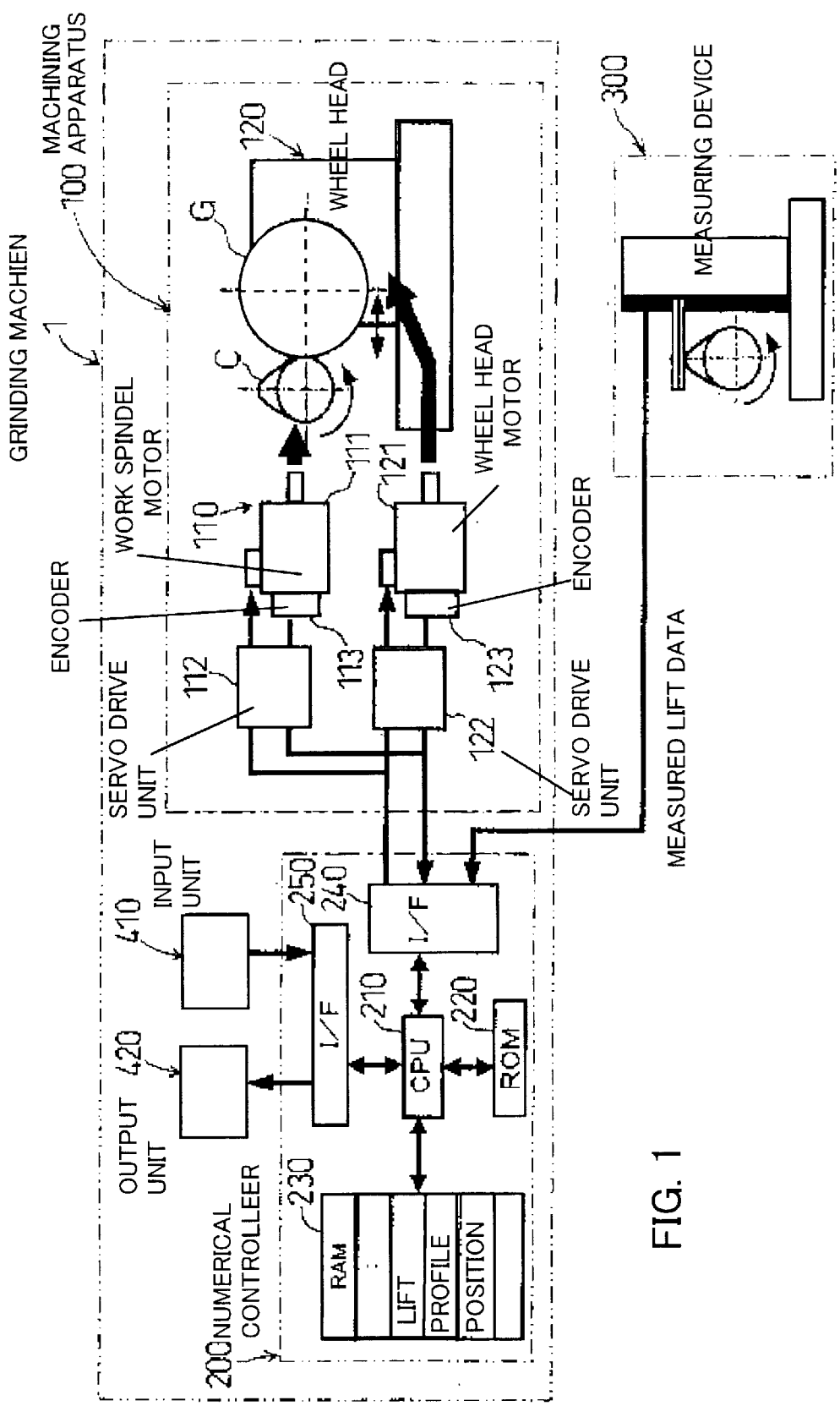
FIG. 1 is a schematic view showing the outline structure of a cam grinding machine according to an embodiment of the present invention.

Referring now to the drawings and, more particularly, to FIG. 1 thereof, a numerically controlled cam grinding machine (i.e. a machine tool) 1 is shown, which comprises a machining apparatus 100 and a numerical controller 200. The numerical controller 200 is connected to a cam measuring device 300. The machining apparatus 100 is provided with a work spindle 110 and a wheel head (i.e. a tool feed axis) 120.

The work spindle 110 drives a cam C (i.e. a workpiece) to be rotated. The work spindle 110 includes a work spindle motor 111 constituted by a servomotor, a servo drive unit 112 having a control circuit for outputting a drive control current to drive the work spindle motor 111, and an encoder 113 for detecting the rotational amount or angle of the work spindle motor 111. The work spindle motor 111 and the encoder 113 are connected to the servo drive unit 112. The servo drive unit 112 is connected to the numerical controller 200 via an interface 240 and a telecommunication cable. The servo drive unit 112 controls the rotational angle of the work spindle motor 111 based upon position command information inputted thereinto from the numerical controller 200. The servo drive unit 112 further outputs (i.e. feedbacks) effective position information inputted thereinto from the encoder 113 to the numerical controller 200 as feedback data.

The wheel head 120 can rotate and displace a grinding wheel G (i.e. a tool). The wheel head 120 includes a wheel head motor 121 constituted by a servomotor, a servo drive unit 122 having a control circuit for outputting a drive control current to drive the wheel head motor 121, and an encoder 123 for detecting the rotational amount or position of the wheel head motor 121. The wheel head motor 121 and the encoder 123 are connected to the servo drive unit 122. The servo drive unit 122 is connected to the numerical controller 200 via the interface 240 and a telecommunication cable. The servo drive unit 122 controls the rotational amount or position of the wheel head motor 121 and hence, the feed position of the wheel head 120 based upon a position command information inputted thereinto from the numerical controller 200. The servo drive unit 122 further outputs or feedbacks an effective position information inputted thereinto from the encoder 123 to the numerical controller 200 as feedback data.

The numerical controller 200 is provided with a fundamental structure as a computer and includes a central processing unit (hereinafter, referred to as CPU) 210 as a calculating unit, a read-only memory (ROM) 220 in which a start program and various programs have been stored, a random access memory (RAM) 230 as a storage means in which input data and programs are temporarily stored, and the interface (I/F) 240 connected to the machining apparatus 100, and an interface (I/F) 250 connected to an input unit 410 such as an operator's panel and an output unit 420 such as a monitor. Ideal lift data, which is described later, is inputted from the input unit 410 to the numerical controller 200. According to one embodiment of the present invention, the CPU 210, the ROM 220, and the RAM 230 cooperate to establish various generating means and various generating steps constituting the present invention.

Figure 2:
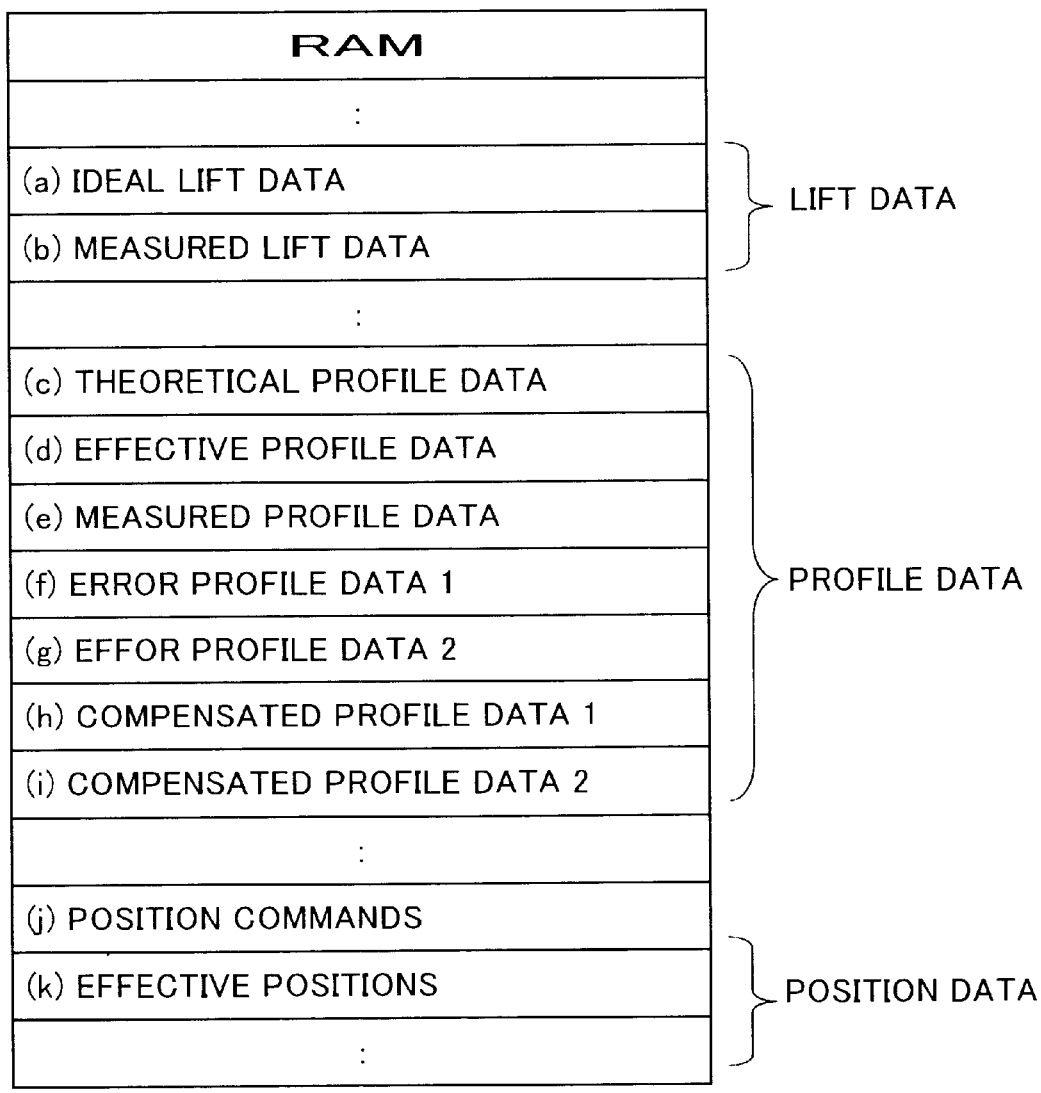
FIG. 2 is an explanatory view showing data to be stored in each area of a random access memory (RAM) when a profile data compensating operation is performed by a numerical controller illustrated in FIG. 1.

Referring to FIG. 2, various data required for compensating profile data according to the embodiment of the present invention are stored in each data area of the RAM 230. The various data are described hereinbelow:

Ideal lift data represents a final geometric shape of the cam C, which is an object to be machined, and corresponds to finished shape data of the present invention. More specifically, the ideal lift data is represented by rotational angles of the cam C and lift amounts of an engine tappet at the respective rotational angles of the cam C. The ideal lift data is determined at the design stage of a camshaft. Design data for designing the camshaft is in advance inputted into the numerical controller 200 from an external device like a computer, not shown.

In the case of cams like eccentric cams of the character that the shape can be determined by calculation processing, it may be the case that the ideal lift data (i.e. the finished shape data) is represented by parameters showing a radius of a base circle portion of the cam, an eccentric amount thereof, and the like.

Measured lift data represents lift data obtained by measuring the machined cam C by the measuring device 300. Theoretical profile data is generated by geometrically converting the ideal lift data per rotation of the cam C into position information (i.e. the feed amounts or positions) of the wheel head 120 corresponding to the rotational angles of the work spindle 110. The position of the wheel head 120 is determined at intervals of 0.5 degree of the rotational angles of the work spindle 110, i.e. at 720 points in total. Effective profile data is generated by converting the effective position information (i.e. effective data) from the encoders 113 and 123 into profile data when the cam grinding machine 1 is operated under a non-load condition, i.e., with the grinding wheel G being out of engagement with the cam C, in accordance with the theoretical profile data. Measured profile data is generated by geometrically converting the measured lift data per rotation of the cam C into the position information (the feed amounts or positions) of the wheel head 120 corresponding to the rotation angles of the work spindle 110. As described above, the position of the wheel head 120 is determined at intervals of 0.5 degree of the rotational angles of the work spindle 110, i.e. at 720 points in total.

Error profile data 1 is generated by subtracting the theoretical profile data from the effective profile data and corresponds to first error profile data of the present invention. The error profile data 1 represents error components of the control system including the numerical controller 200, the servo drive units 112, 113, servomotors 111, 12, the encoders 113, 123 and the like. Error profile data 2 is generated by subtracting compensated profile data 1 (described later) from the measured profile data and corresponds to second error profile data of the present invention. The error profile data 2 represents error components of the mechanical system of the machining apparatus 100 including drive trains such as work spindle drive, feed screw mechanisms and other mechanical elements like workpiece support, grinding wheel support, machine frame, grinding wheel, and so on.

The compensated profile data 1 is generated by subtracting the error profile data 1 from the theoretical profile data and corresponds to first compensated profile data of the present invention. The compensated profile data 1 is employed for compensating for the error components involved in the control system. Compensated profile data 2 is generated by subtracting the error profile data 1 and the error profile data 2 from the theoretical profile data and corresponds to a second compensated profile data of the present invention. The compensated profile data 2 is employed for compensating for the error components due to the mechanical system.

The position command information represents position data (command values) for the work spindle 110 outputted to the servo drive unit 112 from the numerical controller 200 and position data (command values) for the wheel head 120 outputted to the servo drive unit 122 therefrom. Each position data is generated by interpolating the compensated profile data 1 or the compensated profile data 2 and is updated in every predetermined cycle, such as 1 ms. The interpolation processing is performed for updating each position data (the command values) by calculating displacement amounts or positions of the work spindle 110 and the wheel head 120 in a predetermined cycle.

The effective position information represents actually effective position data (an effective value) of the work spindle 110 detected from the encoder 113 and actually effective position data (an effective value) of the wheel head 120 detected from the encoder 123. Each effective position data is outputted to the numerical controller 200 via a corresponding one of the servo drive units 112 and 122. Each effective position data is updated in a predetermined cycle (e.g. 1 ms) in the same manner as the position data (the command value) corresponding thereto.

The processing for generating the various profile data referred to above will be described hereinbelow with reference to FIGS. 3, 4, and 5.

(Generation of the Error Profile Data 1)

Figure 3:
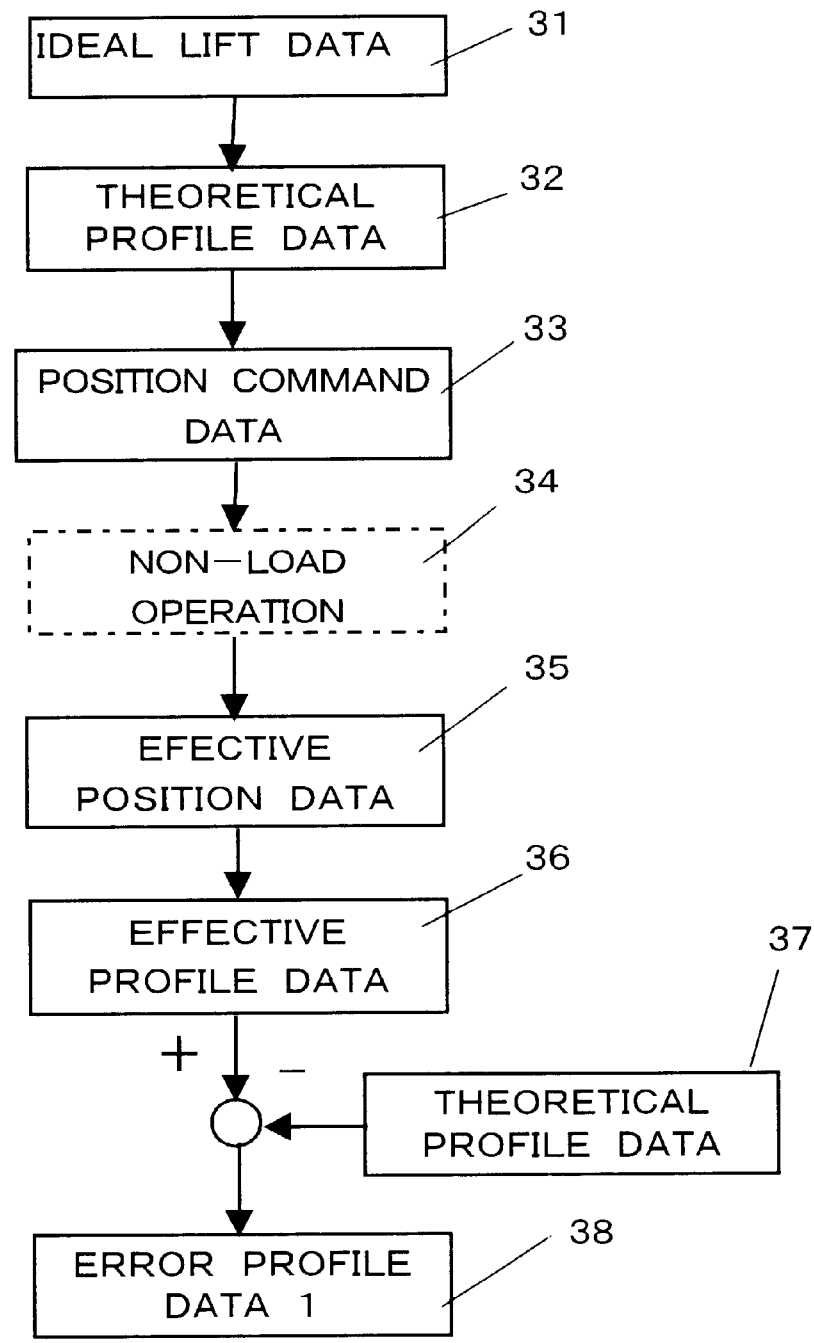
FIG. 3 is a flow chart explaining a process for generating first error profile data in the profile data compensating operation according to the embodiment of the present invention.

As illustrated in FIG. 3, the CPU 210 reads the ideal lift data which has been stored in the RAM 230, at step 31. The program proceeds to step 32 of converting the ideal lift data into the theoretical profile data in accordance with a predetermined lift-profile conversion formula. The theoretical profile data is written into the RAM 230 (i.e. a theoretical profile data generating step). The program proceeds to step 33 of reading in the theoretical profile data from the RAM 230 and for outputting the command position information based upon the theoretical profile data to the servo drive units 112 and 122 from the numerical controller 200. At step 34, the machining apparatus 100 is numerically controlled by the numerical controller 200 based upon the command position information under the condition that the grinding wheel G has been off-set by a machining amount (i.e., a grinding allowance) or greater the same from the cam C being set up on the work spindle 110 so as to prevent the grinding wheel G from coming in contact with the cam C. Thus, the grinding apparatus is operated under a non-load condition with no grinding force acting on the grinding wheel G. At step 35, the effective position information, which are obtained from the encoders 113 and 123 via the servo drive units 112 and 122 during the operation of the machining apparatus 100 under the non-load condition, are written into the RAM 230. At step 36, the effective profile data is generated based upon the effective position information and is written into the RAM 230. The aforementioned steps 33, 34, 35 and 36 correspond to an effective profile data generating step of the present invention, and an effective profile data generating means of the present invention is constituted by the RAM 230 storing the various data, the ROM 220 storing the various processing programs, and the CPU 210 as the calculating unit.

The program proceeds to step 37 of reading the theoretical profile data from the RAM 230. At step 38, the error profile data 1 is generated based upon the theoretical profile data and the effective profile data in accordance with the following equation (1).

(Error profile data 1)=(Effective profile data)−(Theoretical profile data) (1)

It is to be noted that the subtraction of one profile data from another profile data at this step 38 or any of other steps 43, 49, 54 referred to later is made with respective components of those data for the same angular position of the work spindle 110, so that the differences are calculated for unit angular positions (e.g., 720 points in this particular embodiment) of the work spindle 110. The error profile data 1 is written into the RAM 230. The aforementioned steps 37 and 38 correspond to a first error profile data generating step of the present invention. A first error profile data generating means of the present invention is constituted by the CPU 210, the ROM 220, and the RAM 230 in the same manner as described above.

(Generation of the Error Profile Data 2)

As illustrated in FIG. 4, the program proceeds to step 41 of reading the theoretical profile data from the RAM 230. At step 42, the error profile data 1 is read from the RAM 230. At step 43, the compensated profile data 1 is generated based upon the theoretical profile data and the error profile data 1 in accordance with the following equation (2):

(Compensated profile data 1)=(Theoretical profile data)−(Error profile data) (2)

The compensated profile data 1 is written into the RAM 230. The aforementioned steps 41, 42, and 43 correspond to a first compensated profile data generating step of the present invention. A first compensated profile data generating means of the present invention is constituted by the CPU 210, the ROM 220, and the RAM 230 in the same manner as described above. The program proceeds to step 44 of generating position command information based upon the compensated profile data 1 and outputting such information to the servo drive units 112 and 122. At step 45, the machining apparatus 100 in which the cam C has been set up onto the work spindle 110 is numerically controlled in response to the position command information, whereby the apparatus is operated to actually grind the cam C. At step 46, the ground cam C is then measured by the measuring device 300. Since the measuring device 300 is connected to the numerical controller 200, the lift data (i.e. the measured lift data) per unit rotational angle of the cam C is automatically inputted into the numerical controller 200. At step 47, the measured profile data is generated based upon the measured lift data through a lift-profile conversion processing known in the art and is written into the RAM 230. The steps 46 and 47 correspond to a measured profile data generating step of the present invention. A measured profile data generating means of the present invention is constituted by the CPU 210, the ROM 220, and the RAM 230 in the same manner as described above.

The program proceeds to step 48 for reading the compensated profile data 1 from the RAM 230. At step 49, the error profile data 2 is generated based upon the compensated profile data 1 and the measured profile data in accordance with the following equation (3):

(Error profile data 2)=(Measured profile data)−(Compensated profile data 1) (3)

The error profile data 2 is written into the RAM 230. The aforementioned steps 48 and 49 correspond to a second error profile data generating step of the present invention. A second error profile data generating means of the present invention is formed by the CPU 210, the ROM 220, and the RAM 230 in the same manner as described above.

(Generation of the Compensated Profile Data 2)

As illustrated in FIG. 5, the program proceeds to step 51 for reading the theoretical profile data from the RAM 230. At step 52, the error profile data 1 is read out, and at step 53, the error profile data 2 is read out. At step 54, the compensated profile data 2 is generated based upon the theoretical profile data, the error profile data 1 and the error profile data 2 in accordance with the following equation (4):

(Compensated profile data 2)=(Theoretical profile data)−(Error profile data 1)−(Error profile data 2)     (4)

The compensated profile data 2 is written into the RAM 230. The aforementioned steps 51, 52, 53, and 54 correspond to a second compensated profile data generating step of the present invention. A second compensated profile data generating means of the present invention is constituted by the CPU 210, the ROM 220, and the RAM 230 in the same manner as described above.

In this manner, the compensated profile data 2 on which both error information of the control system and the mechanical system are reflected is generated. The program then proceeds to step 55, so that the numerical controller 200 outputs the position command information in accordance with the final compensated profile data 2 to the servo drive units 112 and 122. At step 56, the machining apparatus 100 in which the cam C has been set up onto the work spindle 110 is numerically controlled in response to the position command information, whereby the cam C is ground to the cam profile as originally intended in precision.

Obviously, many modifications and variations of the present invention are possible in light of the foregoing teachings. Specifically, the compensated profile data 2 can be obtained by excluding the error components of the mechanical systems from the compensated profile data 1. This can be done by subtracting the error profile data 2 from the compensated profile data 1 rather than by subtracting the error profile data 1 and the error profile data 2 from the theoretical profile data as shown in FIG. 5.

Where cams or workpieces of different kinds are to be ground on the grinding apparatus 10, the profile data compensating operation can be performed on a kind-by-kind basis, and cams or workpieces of the same kinds can be ground in accordance with the compensated profile data 2 generated for that kind. However, when the tool such as the grinding wheel G is exchanged with another one even though workpieces of the same kind are to be machined as before, another profile data compensating operation is required to be performed for the replaced tool. In this case, the compensating operation-can be performed simply by updating the error profile data 2 and the compensated profile data 2 reflecting the same.

In the aforementioned embodiment of the present invention, description has been made on the premise that the profile data compensating operation is performed-only once for workpieces of each kind. However, the profile data compensating operation may be repeatedly performed for those of each kind. This can advantageously make the generated profile data and hence, the final or second compensated profile data 2 more accurate. In this case, plural sets of the second compensated profile data 2 are generated by repeatedly performing all the steps of the aforementioned profile data compensating operation, and then, the final or second compensated profile data 2 can be determined by averaging the plural sets of those data 2. Alternatively, the step of generating the error profile data 1 and the step of generating the error profile data 2 can be separately and repeatedly performed, and then, the average of plural profile data 1 and the average of plural profile data 2 are extracted for use in generating the final or second compensated profile data 2.

According to the embodiment of the present invention, the error profile data 1 (i.e. the first error profile data) and the error profile data 2 (i.e. the second error profile data) are employed at intermediate stages for generating the compensated profile data 1 (i.e. the first compensated profile data) and the compensated profile data 2 (i.e. the second compensated profile data), respectively. However, in a modified embodiment of the present invention, the first compensated profile data (CP1) can be generated without using the first error profile data (ΔP1) but using the theoretical profile data (TP) and the effective profile data (EP) as expressed by the following equations:

$$\Delta P1 = EP - TP,\ CP1 = TP - \Delta P1 = 2 \times TP - EP$$

That is, when the first compensated profile data CP1 only is to be generated, the first error profile data ΔP1 is not necessary. In this modified case, accordingly, the first error profile data generating means and step can be assumed to have been incorporated into the first compensated profile data generating means and step respectively. Therefore, this modification is still in the scope of the present invention.

The same is applied between the measured profile data, the second error profile data and the second compensated profile data. In this case, the second error profile data generating means and step can be assumed to have been incorporated into the second compensated profile data generating means and step. The second error profile data corresponds to the difference of the measured profile data from the first compensated profile data. However, the first compensated profile data is not necessarily requisite to generate the second error profile data. This is because the second error profile data can be generated by the use of the theoretical profile data and the first error profile data in substitute for the first compensated profile data.

Further, the effective data can be obtained from detectors such as encoders 113, 123 attached to the work spindle 110 and the tool feed axis 120. Such detectors like the encoders are conventionally equipped to the servomotors 111, 121 which are numerically controlled. Therefore, other detectors are not additionally required for this purpose.

The measured lift data is obtained by measuring the workpiece such as the cam C, which has been machined in accordance with the compensated profile data 1, by the cam measuring unit 300 or the like. However, preferably, an arrangement may be provided wherein such measured lift data is automatically fed into the numerical controller 200.

Most preferably, the method of compensating the profile data according to the present invention is applied to cam grinding. In this case, the workpiece is the cam and the tool feed axis is the wheel head feed drive system, the final shape data and the measured lift data are the cam lift data, the machine tool is the cam grinding machine having the grinding wheel G as tool. However, the present invention can be applicable to machining some other workpieces, such as crankpins of a crankshaft for instance. The present invention is also applicable to other types of machine tools like millers and laths for cutting cams, crankpins or the like with a cutter or bite as tool.

As described above, according to the embodiment of the present invention, the error components, which may occur upon machining the workpiece in accordance with the profile data, are divided into the error components of the control system and the error components of the mechanical system. The error components of the control system are extracted as the error profile data 1 (i.e. the first error profile data) and the error components of the mechanical system are extracted as the error profile data 2 (i.e. the second error profile data). That is, the error components of the control system and the error components of the mechanical system can be clarified separately. The compensating operation for the error components of the control system does not substantially affect on that for the error components of the mechanical system and vise versa. The error components corresponding to each system can be hence properly compensated and further can be reliably cancelled. Therefore, the present invention can effectively reduce the error components involved in each system with a higher reliability and can generate such a compensated profile data capable of machining the workpiece in a higher machining accuracy in comparison with those generated in the known methods as described above as prior art. Still further, the present invention can efficiently perform the profile data compensating operation by employing the error components of each system separately from those of the other system.

The principles, preferred embodiment and mode of operation of the present invention have been described in the foregoing specification. However, the invention which is intended to be protected is not to be construed as limited to the particular embodiment disclosed herein. Further, the embodiment described herein is to be regarded as that for illustrative purpose rather than being restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method of compensating a profile data used in a numerical controller of a machine tool for machining a workpiece by numerically controlling a work spindle and a tool feed axis in accordance with said profile data which define rotational angles of said work spindle for rotating said workpiece as an object to be machined and feed amounts or positions of said tool feed axis for displacing a tool to machine said workpiece in synchronism with the rotational angle of said work spindle, said method comprising:

an effective profile data generating step of generating an effective profile data based upon effective data which are obtained by numerically controlling said work spindle and said tool feed axis in accordance with theoretical profile data geometrically obtained based upon finished shape data of said workpiece under a non-load condition that said tool feed axis is off-set relative to said workpiece by at least a machining amount so as not to actually machine said workpiece being set up on said work spindle, and by actually detecting rotational angles of said work spindle and said feed amounts or positions of said tool feed axis;

a first error profile data generating step of generating first error profile data corresponding to the differences between said effective profile data and said theoretical profile data under said non-load condition, said first error profile data including error components in a system of said numerical controller;

a first compensated profile data generating step of generating first compensated profile data by compensating said theoretical profile data for said first error profile data;

a measured profile data generating step of generating measured profile data based upon measured lift data which are obtained by numerically controlling said work spindle and said tool feed axis in accordance with said first compensated profile data to actually machine said workpiece with said tool and by measuring the shape of said workpiece actually machined;

a second error profile data generating step of generating second error profile data corresponding to the differences between said measured profile data and said first compensated profile data, said second error profile data including mechanical error components in said machine tool; and a second compensated profile data generating step of generating second compensated profile data by compensating said first compensated profile data for said second error profile data or by compensating said theoretical profile data for said first error profile data and said second error profile data.

2. A method of compensating a profile data, according to claim 1, wherein a lift-profile conversion processing is executed at said measured profiled data generating step for converting said measured lift data into said measured profile data.

3. A method of compensating a profile data, according to claim 2, wherein said workpiece comprises a cam, said tool feed axis comprises a wheel head feed mechanism, and said finished shape data and said measured lift data are lift data of said cam, and said machine tool is a cam grinding machine.

4. A method of compensating a profile data, according to claim 2, wherein said workpiece comprises a crankpin of a crankshaft, said tool feed axis comprises a wheel head feed mechanism, and said finished shape data and said measured lift data are data defining rotational angle data of said crankpin and feed position data of said wheel head feed mechanism related to said rotational angle data, and said machine tool is a crankshaft grinding machine.

5. A numerical controller for a machine tool for machining a workpiece by numerically controlling a work spindle and a tool feed axis in accordance with profile data which define rotational angles of said work spindle for rotating said workpiece as an object to be machined, and feed amounts or positions of said tool feed axis for displacing said tool to machine said workpiece in synchronism with said rotational angles of said work spindle, said controller comprising:

an effective profile data generating means for generating effective profile data based upon effective data which are obtained by numerically controlling said work spindle and said tool feed axis in accordance with theoretical profile data geometrically obtained based upon finished shape data of said workpiece under a non-load condition that said tool feed axis is off-set from said workpiece by at least a machining amount so as not to actually machine said workpiece being set up on said work spindle, and by actually detecting rotational angles of said work spindle and said feed amounts or positions of said tool feed axis;

a first error profile data generating means for generating first error profile data corresponding to the differences between said effective profile data and said theoretical profile data under said non-load condition, said first error profile data including error components in a system of said numerical controller;

a first compensated profile data generating means for generating first compensated profile data by compensating said theoretical profile data for said first error profile data;

a measured profile data generating means for generating measured profile data through a lift-profile conversion processing based upon measured lift data which are obtained by numerically controlling said work spindle and said tool feed axis in accordance with said first compensated profile data to actually machine said workpiece with said tool and by measuring the shape of said workpiece actually machined;

a second error profile data generating means for generating a second error profile data corresponding to the difference between said measured profile data and said first compensated profile data, said second error profile including mechanical error components in said machine tool; and a second compensated profile data generating means for generating second compensated profile data by compensating said first compensated profile data for said the second error profile data or by compensating said theoretical profile data for said first error profile data and said second error profile data.

6. A machine tool comprising:

a work spindle for rotating a workpiece as an object to be machined;

a tool feed axis for displacing a tool to machine said workpiece; and a numerical controller for numerically controlling said work spindle and said tool feed axis in accordance with profile data which define rotational angles of said work spindle and feed amounts or positions of said tool feed axis in synchronism with the rotational angles of said work spindle, wherein said numerical controller comprises:

an effective profile data generating means for generating effective profile data based upon effective data which are obtained by numerically controlling said work spindle and said tool feed axis in accordance with theoretical profile data geometrically obtained based upon finished shape data of said workpiece under a non-load condition that said tool feed axis is off-set from said workpiece by at least a machining amount so as not to actually machine said workpiece being set up on said work spindle, and by actually detecting rotational angles of said work spindle and said feed amounts or positions of said tool feed axis;

a first error profile data generating means for generating first error profile data corresponding to the differences between said effective profile data and said theoretical profile data under said non-load condition, said first error profile data including error components in a system of said numerical controller;

a first compensated profile data generating means for generating first compensated profile data by compensating said theoretical profile data for said first error profile data;

a measured profiled data generating means for generating measured profile data through a lift-profile conversion processing based upon measured lift data which are obtained by numerically controlling said work spindle and said tool feed axis in accordance with said first compensated profile data to actually machine said workpiece with said tool and by measuring the shape of said workpiece actually machined;

a second error profile data generating means for generating a second error profile data corresponding to the difference between said measured profile data and said first compensated profile data, said second error profile data including mechanical error components in said machine tool; and a second compensated profile data generating means for generating second compensated profile data by compensating said first compensated profile data for said the second error profile data or by compensating said theoretical profile data for said first error profile data and said second error profile data.

* * * * *

UNITED STATES PATENT AND TRADEMARK OFFICE
CERTIFICATE OF CORRECTION

PATENT NO.    : 6,721,622 B2
DATED         : April 13, 2004
INVENTOR(S)   : Inagaki et al.

It is certified that error appears in the above-identified patent and that said Letters Patent is hereby corrected as shown below:

<u>Title page,</u>
Item [30], Foreign Application Priority Data, should read:
-- [30]         Foreign Application Priority Data
       Sep. 14, 2001   (JP)………………………..2001-280275 --

Signed and Sealed this

Sixth Day of July, 2004

JON W. DUDAS
*Acting Director of the United States Patent and Trademark Office*